6567X
B. P. COSTON.
Meat Chopper.
Patented June 13, 1831.
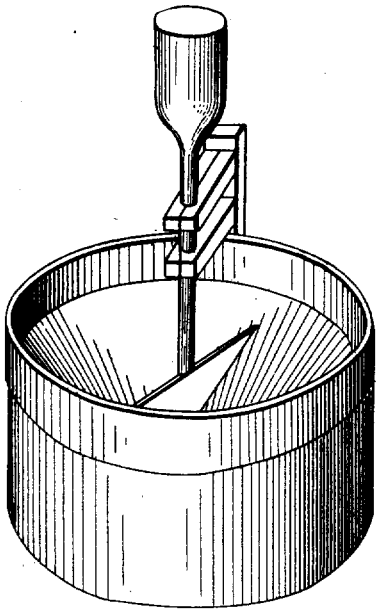
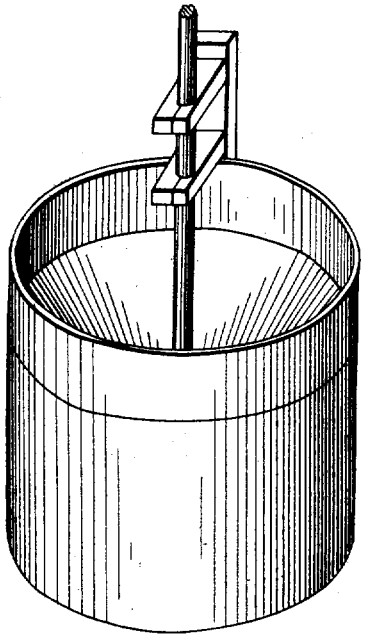
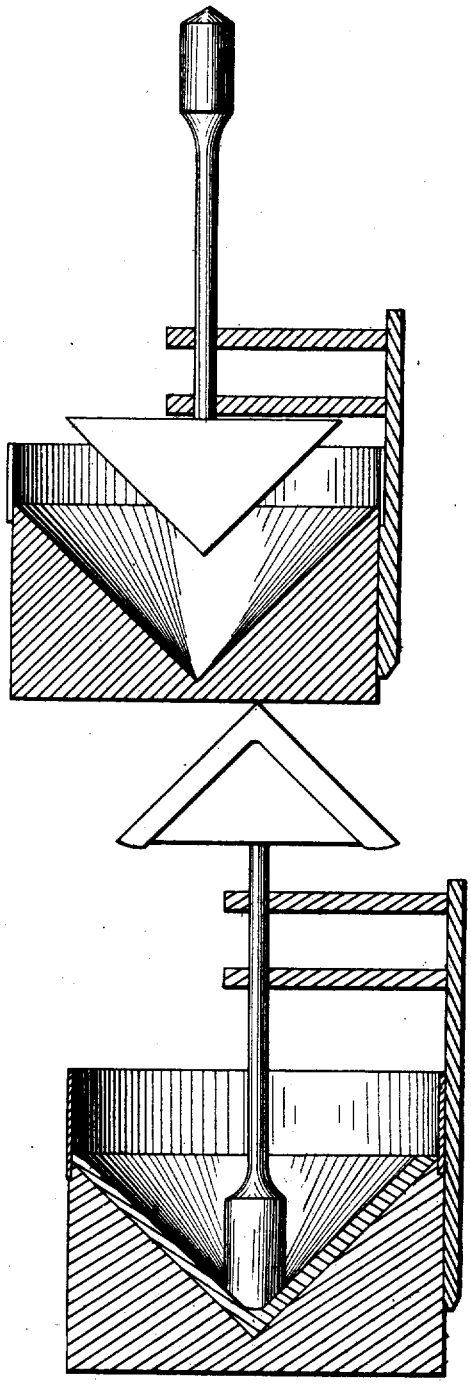
THE NORRIS PETERS CO., PHOTO-LITHO., WASHINGTON, D. C.

6561X June 13. 1831

Benton P. Coston of the City of Philadelphia Penn.

The Schedule referred to in these Letters Patent, and making
part of the same, containing a description in the words of the
said Benton P. Coston himself, of his improvement in the
machine for chopping meat & pulverizing Spices, hommony &c.

This invention consists of a cylindrical block of wood, perfora-
-ted on its upper surface by an inverted conical chamber which
constitutes the chopping mortar. A cylinder of tin or other met-
-al of the same diameter as the wooden block, expands a sufficient
height (above the top of the block) to contain the required quantity
of the substance to be chopped or pulverized. From one side of the
block an upright extends, having two spur pieces answering the
purpose of guides having hinged ends capable of being opened
or closed as may be required in the use of the machine. The most
important parts of this contrivance, are the chopping block, a
straight wooden handle, having a knife attached at one end with
two cutting edges at right angles with each other agreeing with
the inclination of the sides of the reversed conic chamber in the
wooden block, on the opposite end of the handle is a Pestle which
is used by placing an iron mortar made to fit the bottom of the
excavated chamber in the block of wood, presenting a harder sub-
-stance for the pestle to act upon in pulverizing spices, coffee &
other hard substances. In operation the weights of the cutting knife
and pestle are reciprocally advantageously to each other. The cut-
-ting knife has a case made to fit its edges and protect them
from external injury, used when the pestle is in operation.

Witnesses
Franklin Lee
John H. James

Benton P. Coston

[illegible]

(336) Patented the 13th June 1831)

Drawing

X